United States Patent [19]

Giannini et al.

[11] Patent Number: 5,017,678
[45] Date of Patent: May 21, 1991

[54] THERMOTROPIC LIQUID CRYSTALLINE POLYMERS

[75] Inventors: Umberto Giannini, Milan; Alfredo Coassolo; Marco Foa', both of Novara; Giampiero Sabarino, Vercelli; L. Lawrence Chapoy, Novara, all of Italy

[73] Assignee: Montedison S.p.A., Milan, Italy

[21] Appl. No.: 532,349

[22] Filed: Jun. 4, 1990

Related U.S. Application Data

[63] Continuation of Ser. No. 352,679, May 10, 1989, abandoned, which is a continuation of Ser. No. 203,808, Jun. 8, 1988, abandoned.

[30] Foreign Application Priority Data

Jun. 16, 1987 [IT] Italy ................... 20909 A/87

[51] Int. Cl.$^5$ ............... C08G 63/02; C08G 63/18
[52] U.S. Cl. .................. 528/190; 528/176; 528/193

[58] Field of Search ............ 528/176, 190, 193

[56] References Cited

U.S. PATENT DOCUMENTS

| | | | |
|---|---|---|---|
| 4,153,779 | 5/1979 | Jackson et al. | 528/176 |
| 4,238,600 | 12/1980 | Jackson et al. | 528/193 |
| 4,360,658 | 11/1982 | Jackson et al. | 528/193 |
| 4,447,593 | 5/1984 | Funakoshi et al. | 528/176 |
| 4,600,765 | 7/1986 | Lee et al. | 528/193 |
| 4,614,791 | 9/1986 | Hutchings et al. | 528/193 |
| 4,668,760 | 5/1987 | Boudreaux, Jr. et al. | 528/176 |

Primary Examiner—John Kight, III
Assistant Examiner—T. Mosley
Attorney, Agent, or Firm—Stevens, Davis, Miller & Mosher

[57] ABSTRACT

Melt-formable thermotropic liquid crystalline polymers containing groups derived from terephthalic acid and a mixture of phenyl hydroquinone, 2-(α-phenylisopropyl) hydroquinone and, if desired, 2,5 bis (α-phenylisopropyl) hydroquinone.

4 Claims, No Drawings

THERMOTROPIC LIQUID CRYSTALLINE POLYMERS

This application is a Continuation of application Ser. No. 352,679, filed May 10, 1989, now abandoned which in turn is a Continuation of application Ser. No. 203,808, filed June 8, 1988 now abandoned.

DESCRIPTION OF THE INVENTION

This invention relates to thermotropic liquid crystalline polymers.

More particularly, this invention re thermotropic liquid crystalline polymers which are easily processable in the melted state and which have the mesogenic group in the main chain.

Thermotropic polyesters which demonstrate optical anistropy in the melted state are known products which have been described in the literature on many occasions, for example: British Polymer Journal (December 1980) p. 54: "Liquid Crystal Polymer"; Journal of Macromolecular Science-Chemistry (1984), p. 1705; "Liquid Crystalline Aromatic Polyesters" Die Augewandte Makromolekulare Chemie, (1982), 109-110, p. 1; "Rigid Chain Polymers", Die Augewandte Makromolekulare Chemie, (1986), 145-146 p. 231; "Thermotropic Liquid Crystalline Polymers", Journal of Molecular Science Review, (1986), C 26 (4) 1986, page 551 :"Liquid Crystalline Polymers, Novel State of Material".

From these polymers it is possible to obtain high toughness fusion fibres of molded products, for example by injection molding, having suitable characteristics of rigidity, hardness and toughness.

The polymers with the properties referred to above must also be easy to process, and highly resistant to heat and oxidation. Finally, because of their crystallinity, these polymers have a high HDT (Heat Distortion Temperature) and a high resistance to attack by solvents.

Polymers which can be obtained by polycondensation of terephthalic acid and hydroquinone (poly1-4-phenyleneterephthalate) melt at temperatures which are too high (more than 600° C.) for them to be processed without decomposition of the polymer itself. One way used to lower the melting point is to use compounds having substituents in the aromatic ring of the hydroquinone or of the terephthalic acid or to modify the polymer by adding other rigidity-inducing comonomers.

U.S. Pat. No. 4,159,365 describes the formation of a polymer obtained by condensation of terephthalic acid and phenyl hydroquinone containing up to 10% of another aromatic or cycloaliphatic group capable of forming polyesters; however, of these groups other substituted hydroquinones are not specifically mentioned.

U.S. Pat. No. 4,360,658 describes the formation of copolyesters by condensation of terephthalic acid, phenyl hydroquinone, and quantities of hydroquinone with a mole content of 25 to 50% of the total quantity of the monomers.

U.S. Pat. No. 4,238,600 describes the preparation of polymers obtained from terephthalic acid, phenyl hydroquinone, and quantities of t-butyl-hydroquinone with a mole content of 25 to 65% of the total quantity of monomers. The polymers described in this patent, however, have a melting point of more than 340° C., increasing with the level of the content of the t-butyl-hydroquinone in the starting mixture.

U.S. Pat. No. 4,447,593 describes the preparation of polymers of terephthalic acid with hydroquinones substituted by alkyl groups containing at least 5 carbon atoms or by aralkyl groups containing at least 7 carbon atoms, in addition to other hydroquinones substituted up to a maximum percentage of 20%.

Finally, U.S. Pat. No. 4,600,765 reports the formation of polyesters by polycondensation of terephthalic acid, phenyl hydroquinone, and (1-phenylethyl) hydroquinone, thereby obtaining liquid crystalline polymers having a melting point around 320° C. However, the presence of a benzylic hydrogen in the substituting group in the chain means that this polymer oxidizes easily under heat with the formation of an extremely stable radical.

The present invention is based on easily processed thermotropic liquid crystalline polymers having good crystalline properties and resistance to oxidation, which are obtained by polycondensation of terephthalic acid, or its functional derivatives, with phenyl hydroquinone, 2- (α-phenylisopropyl) hydroquinone, and, if desired, 2,5-bis (α-phenylisopropyl) hydroquinone.

Thus, this invention relates to thermotropic liquid crystalline polyesters containing the following repeating groups:

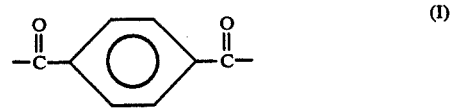

(I)

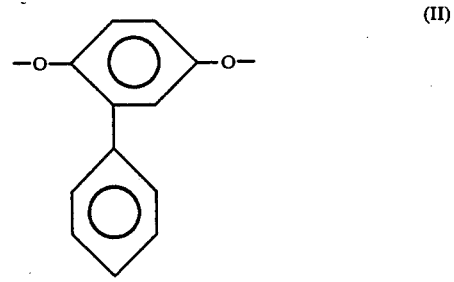

(II)

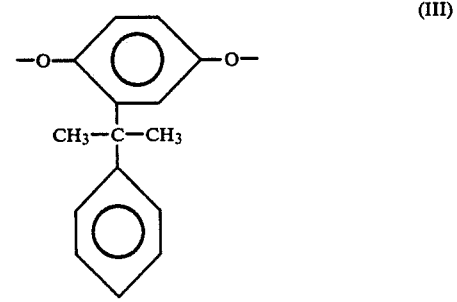

(III)

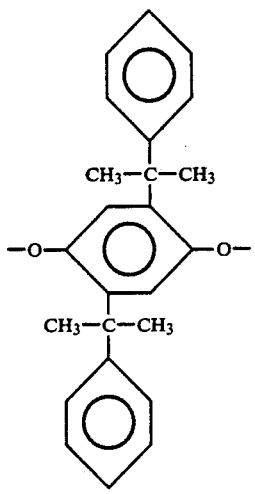

(IV)

in which the molar ratio I/(II+III+IV) is 1, the molar ratio II/III is between 0.4 and 2.4, while the molar ratio IV/III is between 0 and 0.4, and preferably between 0.01 and 0.1.

The polymers of this invention are optically anisotropic in the melted state as can be seen by analysis under an optical microscope with polarised light. They have a melting point of between 290° and 330° C., an inherent viscosity of between 0.3 and 2 dl/g measured in a 1:1 mixture of trifluoroacetic acid and methylene chloride at a concentration of 2.5 g/liter.

The molecular weight and the crystallinity may be increased by heating the polymer particles in an inert environment or under vacuum just below the melting point for a time varying between 1 and 20 hours. For example, heating for two hours produces a crystallinity of approximately 20% by volume.

The polymers of this invention are suitable for use for obtaining products which may be prepared by means of ordinary theremoplastic polymer processing techniques such as, for example, injection or extrusion moulding. They may be processed in film or fiber form, they may be utilized as matrices for fiber or filler-based composites, and they may be used in the preparation of mixtures with other polymers.

The preparation of liquid crystalline polymers containing repeating groups of formulae (I), (II), (III) and, if desired, (IV) may be carried out using conventional techniques, by inducing the reaction of the precursors of the above-mentioned groups under normal and conventional conditions for the of preparation of polyester resins.

The preferred precursors for group (I) are terephthalic acid or the corresponding dihalides such as terephthaloyl chloride; the preferred precursors for group (II) are the diol which is commercially available or the corresponding acetates or propionates which may be obtained by normal esterification techniques; the preferred precursors for groups III and IV are the diols whose preparation is described in U.S. Pat. No. 2,247,404 or the corresponding acetates or propionates.

According to one method, the liquid crystalline polyesters of this invention may be obtained in the melted state or in the presence of a dispersion agent, at a high boiling point, such as diphenyl sulfone or mixtures of partially hydrogenated terphenyl, by transesterification between terephthalic acid and phenol acetates or propionates at a temperature between 250° and 350° C. in order to encourage the complete evolution of carboxylic acid, operating under vacuum.

The reaction may optionally be conducted in the presence of a transesterification catalyst such as, for example, a phosphate of an alkali metal or of an alkaline earth metal.

Other catalysts may be those commonly used in processes of polycondensation and described in the "Encyclopaedia of Polymer Science and Technology", (1969), Vol. 10, pages 722–723.

Examples of such catalysts are oxides, hydroxides, hydrides, halides, alcoholates or phenolates; salts and complex salts of organic or inorganic acids of lithium, sodium, potassium, magnesium, calcium, titanium, manganese, cobalt, zinc, tin, antimony, lanthanum, cerium, lead and germanium.

The quantity of catalyst required is a molar volume of between 0.005 and 1%, preferably between 0.01 and 0.2%, calculated on the total quantity of the reagents.

According to an alternative method, the liquid crystalline polyesters of this invention may be made in solution, by polycondensation between a halide of the terephthalic acid and the mixture of diols in a suitable solution. The temperature is between 25° and 220° C. and the reaction is conducted in the presence of a base and/or a flow of nitrogen to encourage the elimination of the hydrohalide acid.

The preferred base is pyridine, while the preferred solvents include halogenated aliphatic and aromatic compounds such as methylene chloride, chlorobenzene, dichlorobenzene and trichlorobenzene.

The polymer obtained in this way is then recovered by evaporating the solvent or by precipitation with a non-solvent and subsequent filtration.

Some non-limiting examples are now given to provide a still clearer description of this invention and how it can be put into practice.

EXAMPLE 1

6.09 g (30 mM) of terephthalic acid dichloride,
2.79 g (15 mM) of phenyl hydroquinone,
3.42 g (15 mM) of 2-(α-phenylisopropyl) hydroquinone, and ;
120 cc of 1,2,4 trichlorobenzenen are fed under a light flow of nitrogen into a 250 cc glass flask with 4 necks, provided with a mechanical agitator, means for a coolant, and a nitrogen inlet tube.

The mixture is kept agitated under a flow of hydrogen for 30 minutes at room temperature and then it is heated up to a temperature of 220° C. in a silicone oil bath.

It is kept at this temperature for 12 hours until the development of HCl has almost ceased. At the termination of polymerization the solution is clear.

With agitation and hydrogen flow maintained, the oil bath is removed and the reaction is allowed to cool. When the reaction mixture reaches a temperature of 50° C., it is poured into acetone and the precipitate is filtered.

The polymer obtained in this way is washed in acetone (twice), in hot water (twice), and in acetone/methyl alcohol (twice).

The final product is dried under vacuum for 2 hours at 160°–170° C.

The dried polymer has a melting temperature (Tm) of about 306° C. and an inherent viscosity of 1.15 dl/g (measured at a temperature of 30° C. in a solvent composed of equal volumes of trifluoroacetic acid and methylene chloride) at a concentration of 2.5 g/liter).

The melted polymer is shown to be optically anisotropic under a polarized light microscope.

EXAMPLE 2-5

Other polyesters are prepared using the procedure described in Example 1.

The quantities of reagents are listed in the table below.

All these polyesters are optically anisotropic in the melted state.

| Example | (a) (mol) | (b) (mol) | (c) (mol) | (d) (mol) | Inherent viscosity dl/g | Melting temperature °C. (Tm) |
|---|---|---|---|---|---|---|
| 2 | 1 | 0.40 | 0.60 | — | 1.00 | 298 |
| 3 | 1 | 0.60 | 0.40 | — | 0.93 | 321 |
| 4 | 1 | 0.70 | 0.30 | — | 1.40 | 329 |
| 5 | 1 | 0.60 | 0.38 | 0.02 | 1.30 | 317 |

(a) = terephthalic acid chloride
(b) = phenyl hydroquinone
(c) = 2 - (α-phenylisopropyl) hydroquinone
(d) = 2.5 - bis (α-phenylisopropyl) hydroquinone The melting temperature is defined by Differential Scanning Calorimetry, with a scanning at 20 C./minute.

The product of Example 3 was heated at 3000° C. for two hours in a current of nitrogen. Crystallinity changed from 5% to 20% in volume while the inherent viscosity increased to 1.85.

EXAMPLE 6

10.86 g (65.36 mM) of terephthalic acid, 7.29 g (39.21 mM) of phenyl hydroquinone, 5.96 g (26.15 mM) of 2-( -phenylisopropyl) hydroquinone, 0.4 g of trisodium phosphate dodecahydrate, 15 g of acetic anhydride, and 32 g of diphenylsulfone are fed under a light flow of nitrogen into a 100 cc round glass flask with 4 necks, provided with a mechanical agitator, a tube for the introduction of nitrogen, a thermometer, and a distilling head.

Maintaining a light flow of nitrogen and under agitation, the reaction mixture is brought up to 140° C. in a high temperature silicone oil bath. It is kept at this temperature for one hour and distillation of acetic acid begins.

The temperature is then brought up to 240° C. and kept there for a further hour. The oil bath is brought up to 280° C. for one hour and then finally to 330° C. for one more hour.

At the end the flask contains a yellow solution which can be well agitated. It is cooled to ambient temperature, still under a light flow of nitrogen, and the solid mass which is obtained is then finely ground.

The powder obtained in this way is washed twice with acetone, twice with hot water, and twice with acetone/methyl alcohol. The solution is centrifuged after each washing and before each filtration.

The final product is vacuum-dried for 2 hours at 160° C.

The polymer obtained in this way has a melting temperature (Tm) of about 308° C. and an inherent viscosity of 0.35 dl/g.

The melted polymer is seen to be optically anistropic under a polarized light microscope.

What is claimed is:

1. A thermotropic liquid crystalline polyester which is optically anisotropic in the melted state, containing the following repetitive groups:

(I)

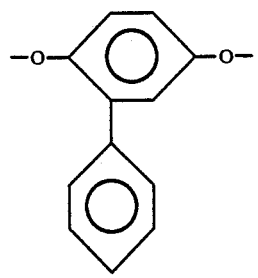
(II)

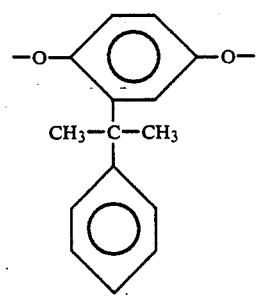
(III)

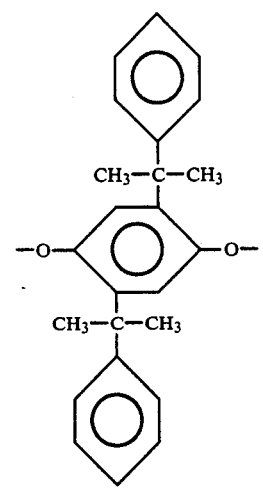
(IV)

with a molar ratio I/II+III+IV of 1, a molar ratio II/III of between 0.4 and 2.4, while the molar ratio IV/III is between 0 and 0.4.

2. A polyester as defined in claim 1, wherein the ratio IV/III is between 0.01 and 0.1.

3. A polyesters according to claim 1, having a melting point of between 290° and 330° C. and an inherent viscosity of between 0.3 and 2 dl/g measured in a 1:1 mixture of trifluoroacetic acid and methylene chloride at a concentration of 2.5 g/l.

4. A polyester according to claim 1 or 2, in the form of fiber, film, injection- or extrusion-molded product, or matrix for fiber or filler-based composites alone or in admixture with other polymer.

* * * * *